June 11, 1935. J. R. COLLYEAR ET AL 2,004,650

FREEWHEEL DRIVING MECHANISM

Filed May 19, 1934

Inventors:
John Robert Collyear +
Samuel Lee Bapty,
By Byrnes, Stebbins + Blenko
attys.

Patented June 11, 1935

2,004,650

UNITED STATES PATENT OFFICE 2,004,650

FREE-WHEEL DRIVING MECHANISM

John Robert Collyear, Bushey, and Samuel Lee Bapty, Harlesden, London, England; said Bapty assignor to Thomas George Baxenden, Hertfordshire, England Application May 19, 1934, Serial No. 726,532
In Great Britain May 29, 1933

5 Claims. (Cl. 74—7)

This invention comprises improvements in free-wheel driving mechanism and has for one of its objects to provide, in a free-wheel mechanism of the type (hereinafter referred to as the type described) in which a spring connecting rotatable driving and driven members for transmission of the drive in one direction is arranged to tend to tighten itself, on rotation of the driving member in the forward direction, against one of the members and thereby to transmit the drive by frictional engagement therewith and to slacken its grip on rotation of the driving member in the reverse direction, means by which the driving connection is automatically released on a sudden decrease in the speed of rotation of the driven member or means by which the driving connection is automatically released when the rate of decrease in the speed of rotation reaches a predetermined amount.

With this object in view the invention provides a free-wheel device of the type described characterized by a flywheel or equivalent inertia device arranged on a sudden decrease in speed of rotation of the driven member to release the driving grip of the spring.

In order to prevent backward rotation of the driven member being transmitted to the driving member under any conditions the mechanism may be provided with a one-way brake engaging the fly-wheel to prevent backwards rotation of the flywheel and thereby to cause the flywheel to release the grip of the spring on backwards rotation of the driven member.

A practical embodiment of the invention as applied to an electrical starting motor for an internal combustion engine will now be described by way of example with reference to the accompanying drawing in which:—

Like reference numerals indicate like parts in both figures of the drawing.

Figure 1:
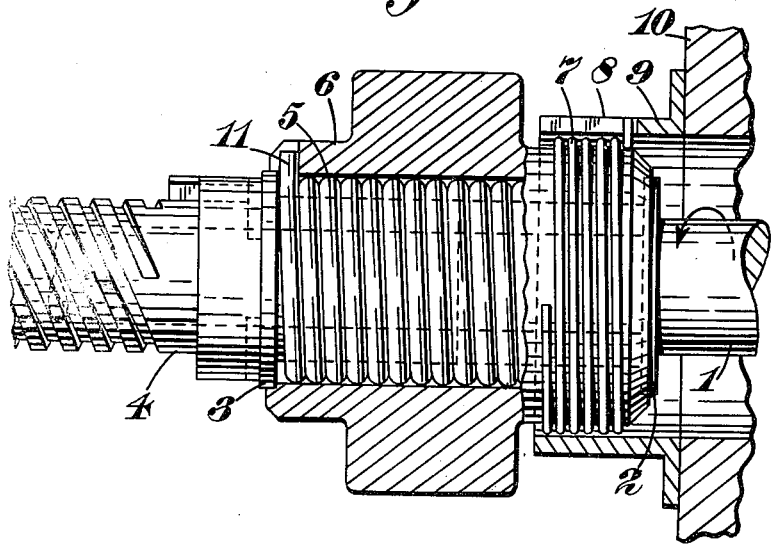
Figure 1 is an elevation partly in section of the free-wheel mechanism.
Figure 2:
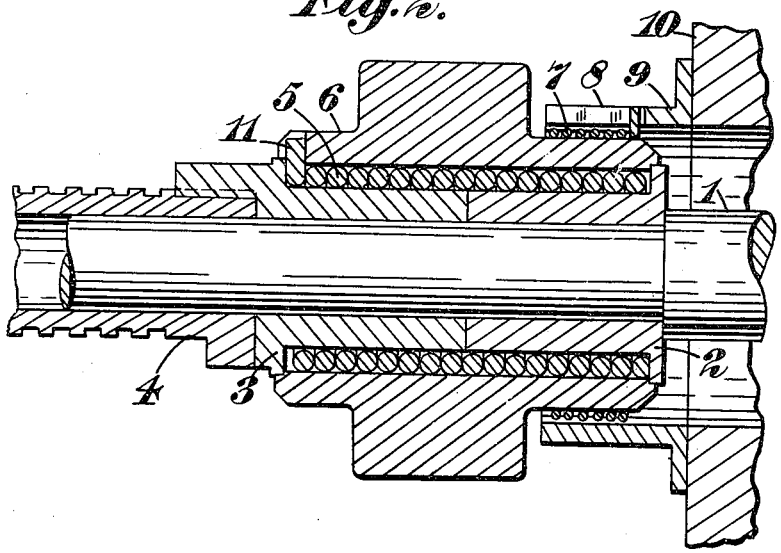
Figure 2 is a section of the free-wheel mechanism as shown in Figure 1.

In this example the driving shaft 1 of the electric motor has keyed to it a sleeve 2 and also carries a second sleeve 3 of the same diameter as the sleeve 2 which is keyed to a further sleeve 4 carrying the screw portion of an automatic coupling device of the kind known under the trade name "Bendix". The sleeves 3 and 4 are rotatable on the motor shaft. Surrounding adjacent portions of the sleeves 2 and 3 is a right-handed helical spring 5 normally in light frictional engagement with both sleeves. The end of the spring 5 overlying the sleeve 3 is turned outwardly at 11 and engages with a fly-wheel 6 which has a second right-handed spring 7 surrounding a portion thereof. The end of this spring 7 nearer to the motor is engaged by a slot 8 formed in a ring 9 attached to the motor 10 and the spring acts as a one-way brake to prevent rotation of the fly-wheel in the backwards direction.

The operation of this arrangement is that on rotation of the motor shaft 1 in the direction of the arrow the spring 5 tends to tighten itself on to the sleeves 2 and 3 and thereby to transmit the drive to the screwed sleeve 4. In the event of backward rotation of the sleeve 4 (due for example to a back-fire of the engine to which the sleeve 4 is connected by the "Bendix" pinion) the tightening of the spring 5 on the sleeve 3 is prevented by the engagement of the end 11 by the fly-wheel 6 which is itself prevented from rotation in the backward direction by the spring 5. The backward rotation of the sleeve 4 is not, therefore, transmitted to the driving shaft and damage to the motor is prevented.

If the motor shaft with its associated sleeves and the fly-wheel are rotating when a sudden decrease in speed of the driven shaft occurs due, for example, to a back-fire, the fly-wheel 6 tends to continue rotating at the same speed and consequently exerts an unwinding action on the spring 5, thereby releasing the driving connection and allowing the motor to continue its rotation.

The invention may also be employed for disengaging the driving connection between two shafts when the rate of decrease of speed of rotation of the shafts reaches a predetermined limit. In this case the spring preferably has a considerable initial grip of the driven shaft and if, for example, a sudden increase in the load occurs resulting in a sudden decrease in the speed of rotation of the driven shaft energy is returned from the fly-wheel until the rate of decrease in speed of rotation reaches an amount determined by the stiffness and initial grip of the spring and also the load being transmitted, when the fly-wheel overcomes the spring and unwinds it a small amount thereby releasing its driving grip.

We claim:

1. A driving mechanism adapted to disengage the drive on a sudden decrease in speed of rotation of the driven member comprising a rotatable driving member, a rotatable driven member, a spring connecting the driving and driven members for transmission of the drive and, under static conditions, in light frictional engagement with the driven member and arranged to tend to increase its grip of the driven member on rotation of the driving member in the forward direction and a flywheel mounted for rotation on one of the members and connected to the end of the spring overlying the driven member in such manner that the spring transmits the drive to the flywheel and, on a sudden decrease in speed of rotation of the driven member, the flywheel releases the driving grip of the spring.

2. A driving mechanism adapted to disengage the drive on a sudden decrease in speed of rotation of the driven member comprising a rotatable driving member, a rotatable driven member, a spring connecting the driving and driven members for transmission of the drive and, under static conditions, in light frictional engagement with the driven member and arranged to tend to increase its grip of the driven member on rotation of the driving member in the forward direction and a flywheel mounted for rotation on one of the members and connected to the end of the spring overlying the driven member in such manner that the spring transmits the drive to the flywheel and, on a sudden decrease in speed of rotation of the driven member, the flywheel releases the driving grip of the spring, and a second spring, secured at one end to a fixed member to prevent rotation of the spring in the backwards direction, surrounding a portion of the flywheel and arranged to tend to grip the flywheel to prevent rotation thereof in the reverse direction and to slacken its grip on rotation of the flywheel in the forward direction.

3. A driving mechanism adapted to disengage the drive on a sudden increase in load comprising a rotatable driving member, a rotatable driven member, a stiff spring connecting the driving and driven members for transmission of the drive and normally tightly gripping the driven member and arranged to tend to increase its grip of the driven member on rotation of the driving member in the forward direction and a flywheel mounted for rotation on one of the members and connected to the end of the spring overlying the driven member in such manner that the spring transmits the drive to the flywheel and on a decrease in speed of rotation of the driven member exceeding a predetermined rate of decrease the flywheel releases the grip of the spring.

4. A self-starter motor for an internal combustion engine having a protective device to prevent damage to the motor by sudden increase in the reaction of the engine comprising an electric motor having a driving shaft, a driven member arranged to be driven by the motor and to transmit the drive to the engine, a spring connecting the shaft of the motor to the driven member for transmission of the drive in one direction arranged to tend to tighten itself, on rotation of the motor shaft in the forward direction, against the driven member and thereby to transmit the drive by frictional engagement therewith and to slacken its grip on rotation of the driving shaft in the reverse direction, and a fly-wheel rotatably mounted on the driving shaft and connected to the end of the spring overlying the driven member in such a manner that the spring transmits the drive to the fly-wheel and on sudden decrease in speed of rotation of the driven member the fly-wheel releases the driving grip of the spring.

5. A self-starter motor for an internal combustion engine having a protective device to prevent damage to the motor by sudden increase in the reaction of the engine comprising an electric motor having a driving shaft, a driven member arranged to be driven by the motor and to transmit the drive to the engine, a spring connecting the shaft of the motor to the driven member for transmission of the drive in one direction arranged to tend to tighten itself, on rotation of the the motor shaft in the forward direction, against the driven member and thereby to transmit the drive by frictional engagement therewith and to slacken its grip on rotation of the driving shaft in the reverse direction, a fly-wheel rotatably mounted on the driving shaft and connected to the end of the spring overlying the driven member in such a manner that the spring transmits the drive to the fly-wheel and on sudden decrease in speed of rotation of the driven member the fly-wheel releases the driving grip of the spring, and a second spring, secured at one end to a fixed member to prevent rotation of the spring in the backwards direction, surrounding a portion of the fly-wheel and arranged to tend to grip the fly-wheel to prevent rotation thereof in the reverse direction and to slacken its grip on rotation of the fly-wheel in the forward direction.

JOHN ROBERT COLLYEAR.
SAMUEL LEE BAPTY.